United States Patent
Vikberg et al.

(10) Patent No.: US 9,426,636 B2
(45) Date of Patent: *Aug. 23, 2016

(54) CIRCUIT-SWITCHED SERVICES OVER SAE/LTE NETWORKS

(71) Applicant: TELEFONAKTIEBOLAGET L M ERICSSON (PUBL), Stockholm (SE)

(72) Inventors: Jari Vikberg, Järna (SE); Andreas Witzel, Herzogenrath (DE); Magnus Hallenstål, Täby (SE); Magnus Olsson, London (GB); Gunnar Mildh, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/740,556

(22) Filed: Jun. 16, 2015

(65) Prior Publication Data

US 2015/0281924 A1 Oct. 1, 2015

Related U.S. Application Data

(60) Continuation of application No. 14/590,282, filed on Jan. 6, 2015, now Pat. No. 9,088,881, which is a division of application No. 12/740,977, filed as application No. PCT/IB2008/002810 on Oct. 21, 2008, now Pat. No. 8,958,389.

(60) Provisional application No. 60/984,426, filed on Nov. 1, 2007.

(51) Int. Cl.
*H04W 4/00* (2009.01)
*H04W 92/04* (2009.01)
*H04W 4/14* (2009.01)
*H04W 68/00* (2009.01)

(52) U.S. Cl.
CPC .............. *H04W 4/14* (2013.01); *H04W 68/005* (2013.01); *H04W 92/045* (2013.01)

(58) Field of Classification Search
None
See application file for complete search history.

(56) References Cited

U.S. PATENT DOCUMENTS

| | | |
|---|---|---|
| 2005/0002407 A1 | 1/2005 | Shaheen et al. |
| 2007/0087739 A1 | 4/2007 | Jung |
| 2008/0214190 A1* | 9/2008 | Aalto .......................... 455/435.1 |
| 2010/0048168 A1* | 2/2010 | Fox .............................. 455/410 |
| 2010/0061295 A1* | 3/2010 | Preteseille .................... 370/328 |

* cited by examiner

*Primary Examiner* — Awet Haile

(57) ABSTRACT

A method and apparatus for providing both Mobile Terminated, MT, and Mobile Originated, MO, circuit switched (CS) services such as Short Message Service, SMS, services in networks utilizing CS Fallback and CSoLTE-I architectures. An extended SGs interface referred to as SGs+ is implemented between a Mobility Management Entity, MME, in an SAE core network and a Mobile Switching Center Server, MSC-S. The SGs+ interface supports transmission of upper layer CS packet data units while utilizing either connectionless or connection-oriented Signaling Connection Control Part, SCCP, operation. The non access stratum, NAS, signaling support between the User Equipment, UE, and the MME is extended to provide support for both MT SMS and MO SMS service.

28 Claims, 14 Drawing Sheets

CIRCUIT-SWITCHED SERVICES OVER SAE/LTE NETWORKS

RELATED APPLICATIONS

This application is a continuation of co-pending U.S. patent application Ser. No. 14/590,282 filed Jan. 6, 2015, which is a divisional of U.S. patent application Ser. No. 12/740,977 filed Apr. 30, 2010, which is a 371 of International Application No. PCT/IB2008/002810, filed Oct. 21, 2008, which claims benefit of U.S. Provisional Application No. 60/984,426, filed Nov. 1, 2007, the disclosures of which are fully incorporated herein by reference.

TECHNICAL FIELD

The present invention relates to wireless telecommunication networks. More specifically, and without limitation, the invention is directed to a system and method for providing circuit-switched (CS) services over SAE/LTE networks, and in particular for supporting the Short Message Service (SMS) in the CS Fallback and CSoLTE-Integrated networks.

BACKGROUND

The following abbreviations are utilized throughout this document:
3GPP Third Generation Partnership Project
AS Application Server
CM Connection Management
CSoLTE CS Services over LTE Radio Access
CS Circuit-Switched
DTM Dual Transfer Mode
eMSC-S evolved MSC Server
EPC Evolved Packet Core
EPS Evolved Packet System
E-UTRAN Evolved UTRAN
FDMA Frequency Division Multiple Access
GSM Global System for Mobile Communications
IASA Inter-Access Anchor
IMS IP Multimedia Subsystem
LAI Location Area Identifier
LTE Long Term Evolution
MME Mobility Management Entity
MSS Mobile Softswitch Solution
NAS Non Access Stratum
OFDM Orthogonal Frequency Division Multiplexing
PCRF Policy Charging Rule Function
PMSC Packet MSC
PCSC Packet CS Controller
PS Packet-Switched
RRC Radio Resource Control
SAE System Architecture Evolution
SAI Service Area Identifier
SCCP Signaling Connection Control Part
SC-FDMA Single Carrier Frequency Division Multiple Access
TA Tracking Area
UPE User Plane Entity
UTRAN Universal Terrestrial Radio Access Network
WCDMA Wideband Code Division Multiple Access Mobile CS services based on GSM and WCDMA radio access are a world-wide success story and provide telecommunication services with a single subscription in almost all countries of the world. The number of CS subscribers is still growing rapidly, boosted by the rollout of mobile CS services in dense population countries such as India and China. This success story is furthermore extended by the evolution of the classical MSC architecture into a softswitch solution, which utilizes a packet transport infrastructure for mobile CS services.

Recently, the 3GPP work item "Evolved UTRA and UTRAN" (i.e., E-UTRAN, started in summer 2006) defined a Long-Term Evolution (LTE) concept that assures competitiveness of 3GPP-based access technology. It was preceded by an extensive evaluation phase of possible features and techniques in the RAN workgroups that concluded that the agreed system concepts can meet most of the requirements and no significant issue was identified in terms of feasibility.

LTE utilizes OFDM radio technology in the downlink and SC-FDMA for the uplink, allowing at least 100 Mbps peak data rate for downlink data rate and 50 Mbps for uplink data rate. LTE radio can operate in different frequency bands and is therefore very flexible for deployment in different regions of the world.

FIG. 1 is a simplified block diagram of nodes in a System Architecture Evolution (SAE) Core Network (SAE CN) 11 and an LTE Radio Access Network (LTE RAN) 12. In parallel to the LTE RAN (E-UTRAN) standardization, 3GPP also drives an SAE work item to develop an evolved core network also called the Evolved Packet Core (EPC). The E-UTRAN and EPC together build up the Evolved Packet System (EPS). The SAE CN 11 is made up of core nodes, which may be further split into a Control Plane (Mobility Management Entity, MME) node 13 and a User Plane (SAE Gateway, SAE-GW) node 14. In the terminology currently used, the SAE-GW contains both User Plane Entity (UPE) and Inter-Access Anchor (IASA) functionality. The SAE-GW also has two different roles defined: Serving GW and Packet Data Network (PDN) GW. The term SAE-GW is used herein for both the Serving GW and the PDN GW. The MME 13 is connected to an eNodeB 15 via an S1-MME interface 16, and the SAE-GW 14 is connected to the eNodeB via the S1-U interface 17. The X2-UP and X2-CP interfaces between eNodeBs are not relevant to the present invention. The SAE architecture is further described in 3GPP TS 23.401 and 23.402.

Common to both LTE and SAE is that only a Packet Switched (PS) domain was initially to be specified, i.e., all services are to be supported via the PS domain. GSM (via DTM) and WCDMA, however, provide both PS and CS access simultaneously. Thus, if telephony services are to be deployed over LTE radio access, an IMS-based service engine is mandatory. It has been recently investigated how to use LTE/SAE as access technology to the existing Mobile Softswitch Solution (MSS) infrastructure. This work, referred to as "CS over LTE" (CSoLTE) or the longer name "CS domain services over evolved PS access," is documented in 3GPP TR 23.879 and in 3GPP TS 23.272.

FIG. 2 is a simplified block diagram of a CSoLTE general architecture 20. A Packet MSC (PMSC) 21 serves both traditional 2G and 3G RANs 22 and the CSoLTE solutions through the LTE RAN 12. The PMSC contains two new logical functions: a Packet CS Controller (PCSC) 23 and an Interworking Unit (IWU) 24. In addition, there is an SGs interface 25 between the MME 13 and an MSC Server (MSC-S) 26. This interface is used for Paging and Mobility Management (MM) signaling to attach a mobile terminal 27 in the MSC-S based on, for example, SAE MM procedures performed between the terminal and the MME using similar principles as exists already for the Gs-interface between the MSC and SGSN in existing GSM and WCDMA networks and defined in 3GPP TS 29.016 and 29.018. The protocol used in the Gs-interface is called BSSAP+ and uses connectionless SCCP and normal MTP layers (or M3UA with SIGT-RAN) in the existing implementations.

SUMMARY

There does not currently exist a satisfactory system and method for providing circuit-switched (CS) services over the SAE/LTE networks currently being studied in 3GPP, and in particular for supporting the Short Message Service (SMS) in what are referred to as the CS Fallback and CSoLTE-Integrated networks.

The present invention utilizes an extended SGs interface (a so-called SGs+ interface) for both Mobile Terminated (MT) and Mobile Originated (MO) SMS services. The prerequisite is that the SGs interface is used for Mobility Management (MM) procedures, that is, the UE becomes attached in the MSC-S. Thus, the present invention applies for the CS Fallback and CSoLTE-I solutions. In addition, the non access stratum (NAS) signaling support between the UE and the MME is extended to provide support for both MT SMS and MO SMS service.

In one embodiment, the present invention is directed to a method of providing a circuit-switched (CS) service to a User Equipment (UE) over an SAE core network and an LTE radio access network. The method includes extending an SGs interface to provide an SGs+ interface between a Mobility Management Entity (MME) in the SAE core network and a Mobile Switching Center Server (MSC-S), wherein the SGs+ interface supports transmission of upper layer packet data units. The method also includes transferring CS service messages in SGs+ messages sent between the MSC-S and the MME utilizing the SGs+ interface; and transferring CS service message contents between the MME and the UE via the LTE radio access network in NAS messages. The method is applicable to both mobile terminated and mobile originated CS services, and different embodiments address UEs in LTE-Idle state and LTE-Active state. In one embodiment, the upper layer packet data units are transmitted utilizing connectionless Signaling Connection Control Part (SCCP) operation, while in another embodiment, the upper layer packet data units are transmitted utilizing connection oriented SCCP operation.

In a particular embodiment, the CS service is SMS, and the present invention is directed to a method in an MSC-S for delivering an SMS message to a terminating UE over an SAE core network and an LTE radio access network. The method includes sending a paging request message from the MSC-S to an MME in the SAE core network with an indication that a mobile terminated SMS message is available for the terminating UE; receiving by the MSC-S, a paging response or service request message from the MME; and forwarding the mobile terminated SMS message from the MSC-S to the MME via an extended SGs interface (SGs+) between the MSC-S and the MME, wherein the SGs+ interface supports transmission of SMS packet data units. In another embodiment in which the CS service is SMS, the present invention is directed to a method in an MME in an SAE core network for transporting an SMS message from an originating UE over an LTE radio access network and an SAE core network to an MSC-S. The method includes receiving in the MME, the mobile originated SMS message from the originating UE via an S1 connection; and forwarding the mobile originated SMS message from the MME to the MSC-S via an SGs+ interface, wherein an SGs interface is extended to provide the SGs+ interface between the MME in the SAE core network and the MSC-S, wherein the SGs+ interface supports transmission of SMS packet data units.

In another embodiment, the present invention is directed to an apparatus in a MME in an SAE core network for providing a CS service to a UE through the SAE core network and an LTE radio access network. The apparatus includes means for utilizing an extended SGs interface (SGs+) with an MSC-S in a CS core network to send and receive SGs+ messages, wherein the SGs+ interface supports transmission of upper layer packet data units, and the means for utilizing the SGs+ interface includes means for transferring CS service messages in SGs+ messages sent over the SGs+ interface. The apparatus also includes means for transferring CS service message contents between the MME and the UE via the LTE radio access network. The apparatus handles both mobile terminated and mobile originated CS services, and different embodiments address UEs in LTE-Idle state and LTE-Active state. In one embodiment, the upper layer packet data units are transmitted utilizing connectionless SCCP operation, while in another embodiment, the upper layer packet data units are transmitted utilizing connection oriented SCCP operation.

In another embodiment, the present invention is directed to an apparatus in an MSC-S for delivering a CS service message to a terminating UE through an MME in an SAE core network and an LTE radio access network. The apparatus includes means for sending a paging request message from the MSC-S to the MME in the SAE core network with an indication that a mobile terminated CS service message is available for the terminating UE; means for receiving by the MSC-S, a paging response or service request message from the MME; and means for forwarding the mobile terminated CS service message from the MSC-S to the MME via an extended SGs interface (SGs+) between the MSC-S and the MME, wherein the SGs+ interface supports transmission of upper layer packet data units in CS service messages.

In another embodiment, the present invention is directed to an apparatus in an MME in an SAE core network for delivering a CS service message to a terminating UE through the SAE core network and an LTE radio access network. The apparatus includes means for receiving from an MSC-S, a paging request message indicating a CS service message is available for the terminating UE; means for determining whether the terminating UE is in LTE-IDLE state or LTE-ACTIVE state; means for paging the terminating UE and for returning a paging response or service request message to the MSC-S, upon determining that the terminating UE is in LTE-IDLE state; and means for returning a paging response or service request message to the MSC-S without paging the terminating UE, upon determining that the terminating UE is in LTE-ACTIVE state. The apparatus also includes means for utilizing an extended SGs interface (SGs+) with the MSC-S to send and receive SGs+ messages, wherein the SGs+ interface supports transmission of upper layer packet data units. The means for utilizing the SGs+ interface includes means for receiving an SGs+ downlink data transfer message sent by the MSC-S in response to the paging response message or service request message, wherein the SGs+ downlink data transfer message includes the CS service message. The apparatus then forwards the CS service message content to the terminating UE via the LTE radio access network.

In another embodiment, the present invention is directed to an apparatus in an MME in an SAE core network for forwarding a CS service message from an originating UE over an LTE radio access network and the SAE core network. The apparatus includes means for receiving in the MME, the mobile originated CS service message from the originating UE via an S1 connection; and means for forwarding the mobile originated CS service message from the MME to the MSC-S via an SGs+ interface, wherein an SGs interface is extended to provide the SGs+ interface between the MME in the SAE core network and the MSC-S, wherein the SGs+ interface supports transmission of upper layer packet data units in CS service messages.

In another embodiment, the present invention is directed to a system for providing a CS service to a UE through an SAE core network and an LTE radio access network. The system includes an MME in the SAE core network; an MSC-S in a CS core network; and an extended SGs interface (SGs+) for sending and receiving SGs+ messages between the MME and the MSC-S, wherein the SGs+ interface supports transmission of upper layer packet data units in CS service messages. The MME and the MSC-S include means for utilizing the SGs+ interface to transfer CS service messages in SGs+ messages sent over the SGs+ interface. The system handles both mobile terminated and mobile originated CS services, and different embodiments address UEs in LTE-Idle state and LTE-Active state. In one embodiment, the upper layer packet data units are transmitted utilizing connectionless SCCP operation, while in another embodiment, the upper layer packet data units are transmitted utilizing connection oriented SCCP operation. In one particular embodiment, the CS service is the Short Message Service (SMS).

BRIEF DESCRIPTION OF THE DRAWINGS

In the following, the essential features of the invention will be described in detail by showing preferred embodiments, with reference to the attached figures in which.

DETAILED DESCRIPTION

Figure 3:
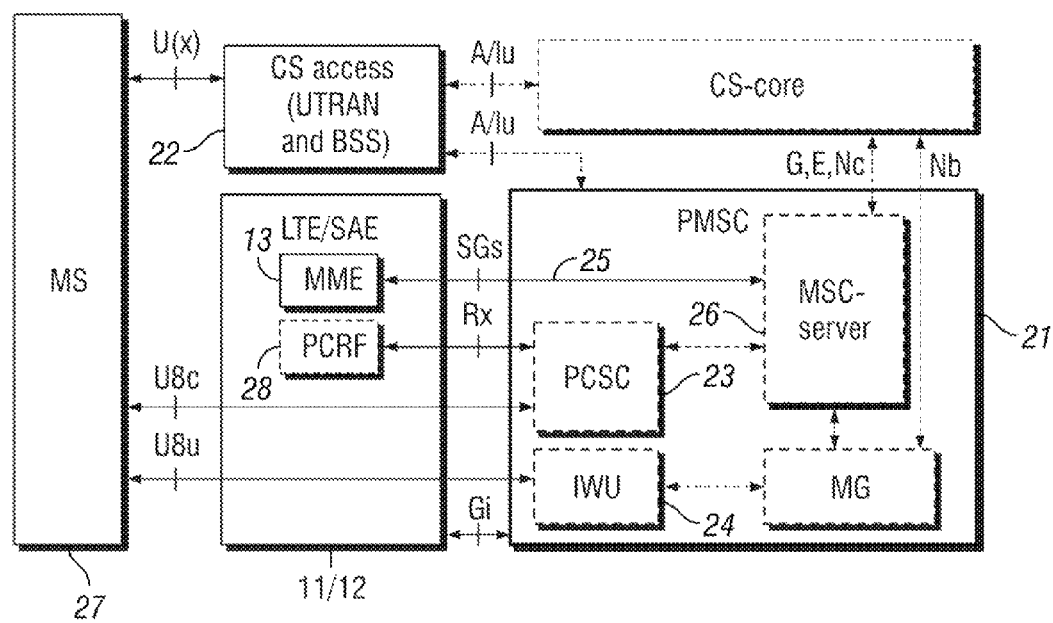
FIG. 3 is a simplified block diagram illustrating interfaces utilized by the PMSC and the PCSC.

FIG. 3 is a simplified block diagram illustrating interfaces utilized by the PMSC 21 and the PCSC 23 in three different embodiments for providing CSoLTE services. The communication between the MS 27 and the PMSC 21 is based on the Gi interface (now called the SGi interface). This means that all direct communication between the MS and the PCSC 23 and the IWU 24 in the PMSC is based on IP protocols and that the MS is visible and reachable using an IP-address via the SAE-GW. This communication is divided into two different interfaces: U8c for the control plane and U8u for the user plane. The PCSC has also an Rx interface to a Policy Charging Rule Function (PCRF) 28 for allocation of LTE/SAE bearers.

Figure 1:
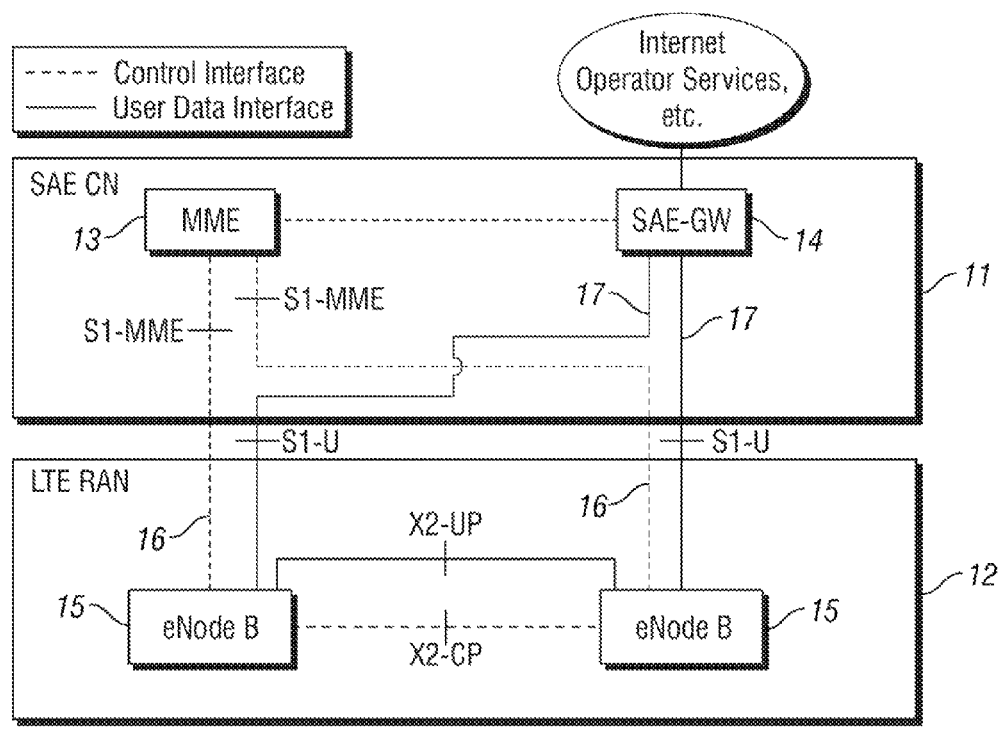
FIG. 1 is a simplified block diagram of nodes in a System Architecture Evolution (SAE) Core Network (SAE CN) and an LTE Radio Access Network (LTE RAN)
Figure 2:
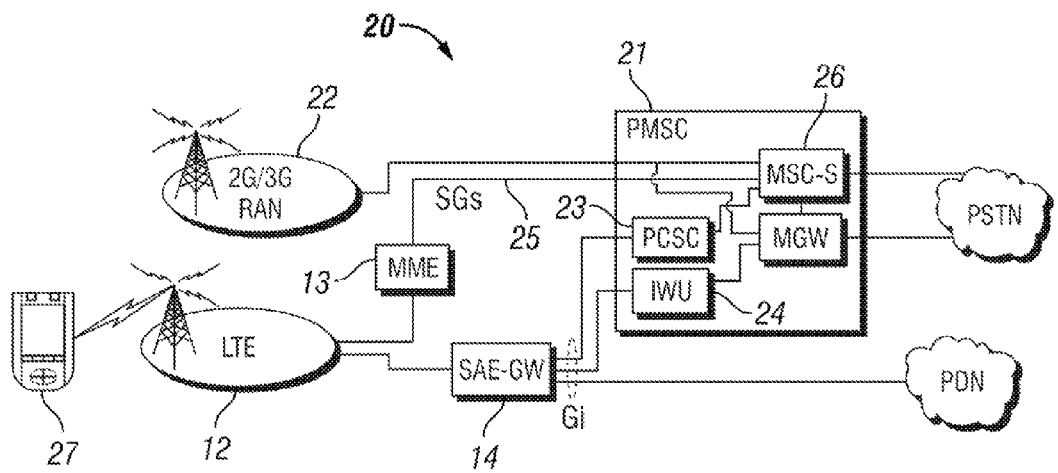
FIG. 2 is a simplified block diagram of a CSoLTE general architecture.

Three different embodiments for providing CSoLTE service are described below. The first embodiment is called "CS Fallback" and means that the MS or terminal 27 is performing SAE MM procedures towards the MME 13 while camping on LTE access. For example, the MME registers the terminal in the MSC-S 26 for CS-based services using the SGs interface 25 shown in FIG. 2. When a page for CS services is received in the MSC-S, the page is forwarded via the SGs interface to the MME and then to the terminal, which performs fallback to the 2G or 3G RANs 22. The fallback can be based on PS HO, Cell Change order, or terminal-based selection of the suitable cell in the 2G or 3G RAN. Similar behavior applies for Mobile Originated (MO) CS services. When these are triggered and the terminal is camping on LTE access, the terminal falls back to the 2G or 3G RANs and triggers the initiation of the CS service there.

The second embodiment is called CS over LTE Integrated (CSoLTE-I). In this embodiment, the same SAE MM procedures as for "CS Fallback" are used over the SGs interface, but instead of performing fallback to the 2G or 3G RANs, the terminal performs all the CS services over the LTE access. This means that the CS services (also called Connection Management (CM) procedures) are transported over IP-based protocols between the PMSC 21 and the terminal 27 over the U8c and U8u interfaces using the LTE access and the SAE nodes such as the SAE-GW 14.

The third embodiment is called CS over LTE Decoupled (CSoLTE-D). In this embodiment, both MM and CM procedures are transported over IP-based protocols directly between the PMSC 21 and the terminal 27 over the U8c and U8u interfaces using the LTE access and the SAE user plane nodes such as the SAE-GW 14.

Figure 4:
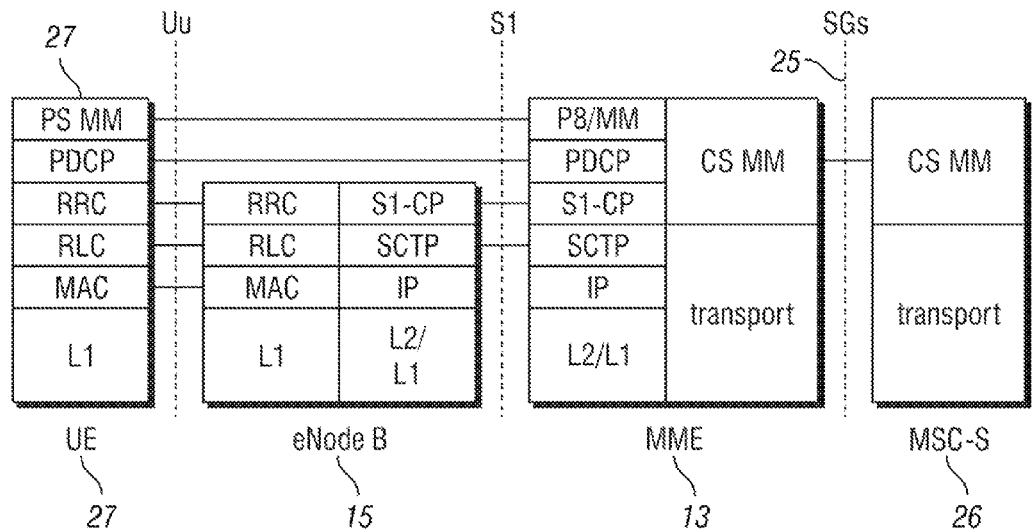
FIG. 4 illustrates the Mobility Management (MM) control plane protocol architecture between the terminal or UE, eNodeB, MME, and the MSC-S.
Figure 5:
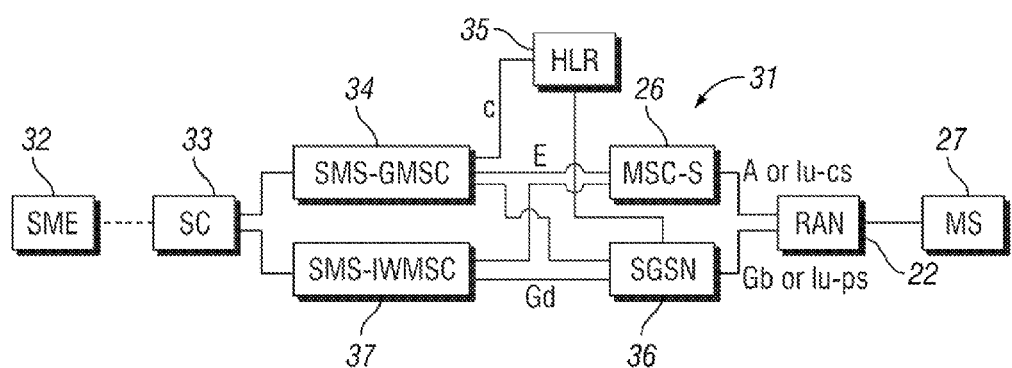
FIG. 5 is a simplified block diagram of the entities and functions included in an existing SMS reference architecture.

FIG. 4 illustrates the MM control plane protocol architecture between the terminal or UE 27, eNodeB 15, MME 13, and the MSC-S 26 (e.g., the SGs interface) that is used in the CS Fallback and CSoLTE-I embodiments. FIG. 5 is a simplified block diagram of the entities and functions included in an existing SMS reference architecture 31. The present invention provides a system and method for improving the support for SMS in relation to the CS Fallback and CSoLTE-I embodiments.

A Short Message Entity (SME) 32 may send or receive Short Messages. The SME may be located either in the fixed or mobile networks and is normally out of scope in the standardization. A Service Center (SC) 33, also referred to as a Short Message Service Center (SMSC) is responsible for the relaying, storing, and forwarding of a short message between an SME and an MS 27. An SMS Gateway MSC (SMS-GMSC) 34 is a function of an MSC for receiving a short message from an SC, interrogating a Home Location Register (HLR) 35 for routing information and SMS information, and delivering the short message to the MSC-S 26 or the SGSN 36 of the recipient MS. An SMS Interworking MSC (SMS-IWMSC) 37 is a function of an MSC for receiving a short message from within the PLMN (i.e., from the MS either via the MSC-S or the SGSN) and submitting it to the recipient SC. The SC, SMS-GMSC, and SMS-IWMSC may be implemented in the same physical node.

The Short Message Service comprises two basic services:
SM MT (Short Message Mobile Terminated); and
SM MO (Short Message Mobile Originated).

Figure 6:
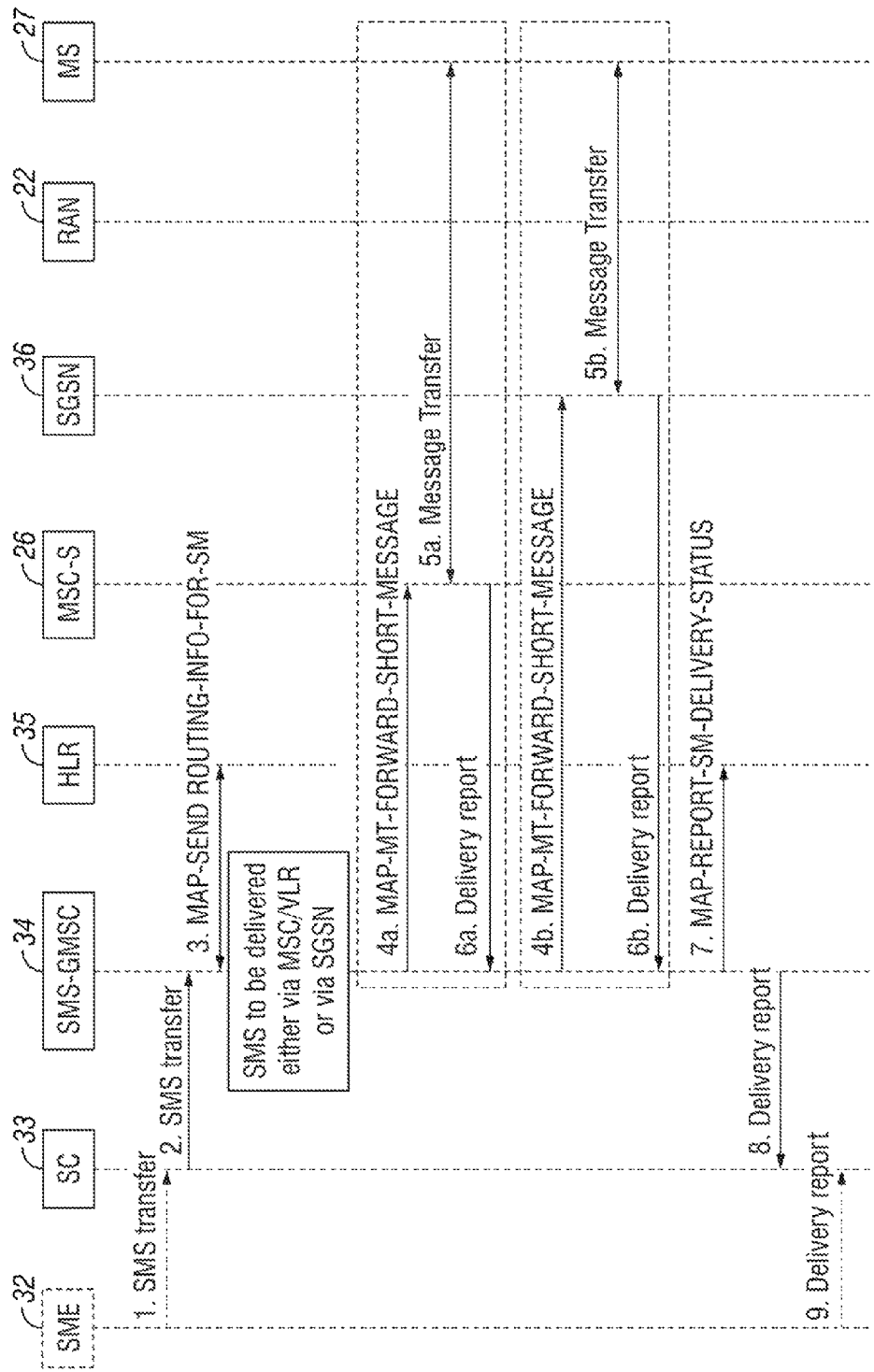
FIG. 6 is a signaling diagram illustrating the main steps involved in Short Message Mobile Terminated (SM MT) services.

FIG. 6 is a signaling diagram illustrating the main steps involved in SM MT services. The SMS transfer is performed over a signaling connection. SM MT denotes the capability of the GSM/UMTS system to transfer a short message submitted from the SC 33 to one MS 27, and to provide information about the delivery of the short message either by a delivery report or a failure report with a specific mechanism for later delivery.

Figure 7:
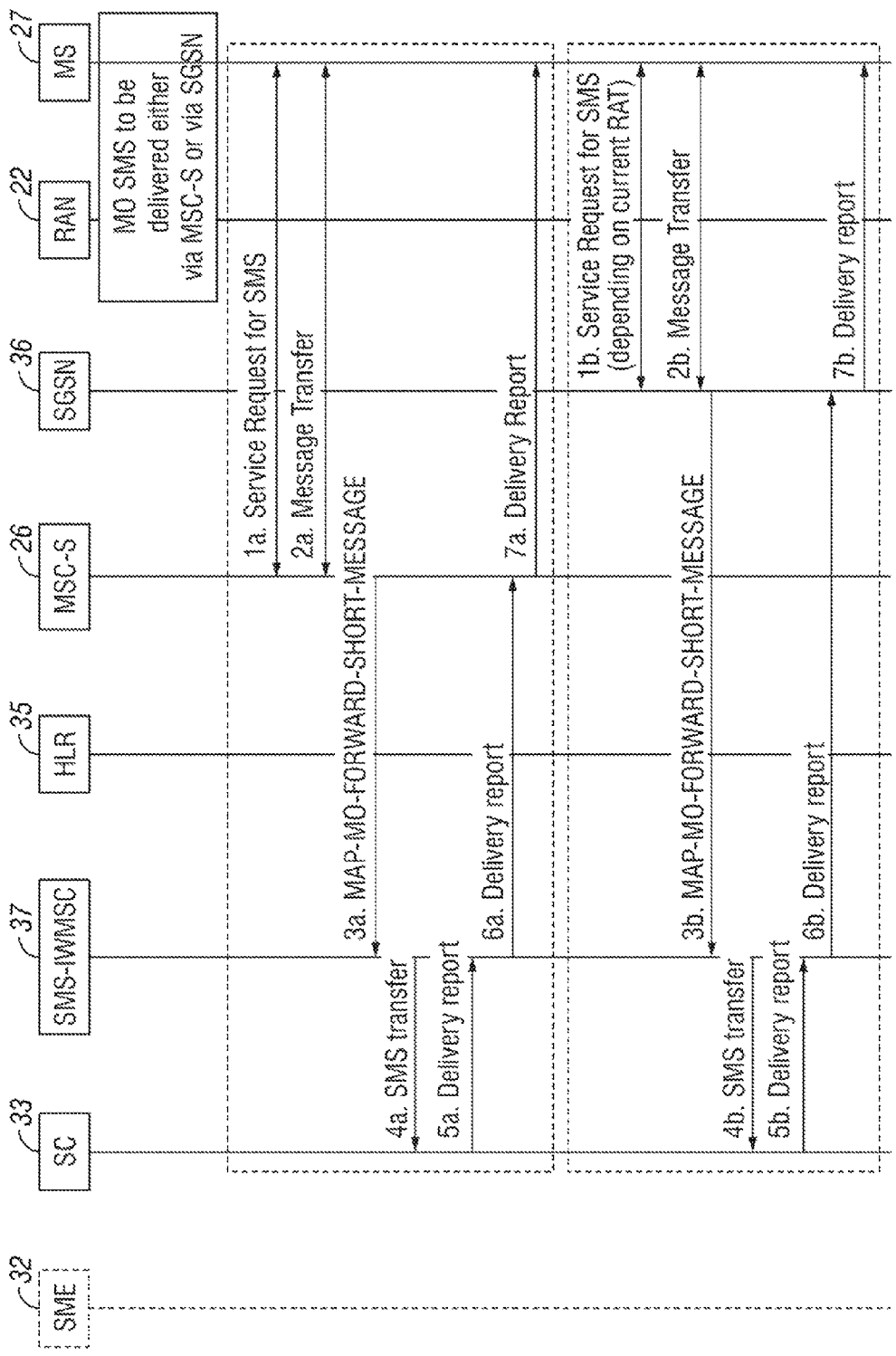
FIG. 7 is a signaling diagram illustrating the main steps involved in Short Message Mobile Originated (SM MO) services.

FIG. 7 is a signaling diagram illustrating the main steps involved in SM MO services. SM MO denotes the capability of the GSM/UMTS system to transfer a short message submitted by the MS 27 to one SME 32 via the SC 33, and to provide information about the delivery of the short message either by a delivery report or a failure report. The message must include the address of the SME to which the SC shall eventually attempt to relay the short message.

Figure 8:
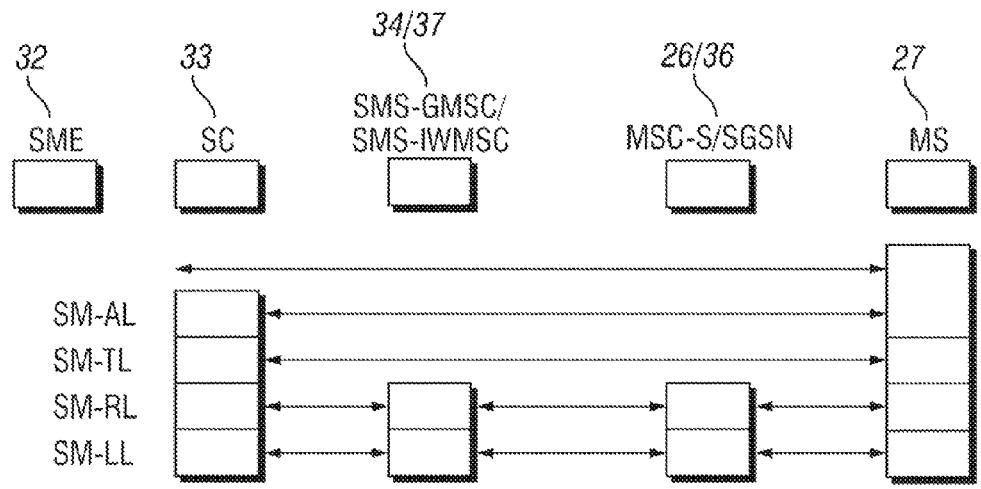
FIG. 8 illustrates the layers of the SMS protocol.

FIG. 8 illustrates the layers of the SMS protocol. A layer named Short Message Lower Layers (SM-LL) implies, for example, the CP-DATA/CP-ACK/CP-ERROR SMS service provided by the CM layer for SMS and transported using DTAP between the MS and the MSC. A Short Message Relay Layer (SM-RL) provides a service to a Short Message Transfer Layer (SM-TL) enabling the SM-TL to send Transfer Protocol Data Units (TPDUs) to its peer entity, receive TPDUs from its peer entity, and receive reports about earlier requests for TPDUs to be transferred. The different messages used by the SM-RL include RP-DATA, RP-ACK, and RP-ERROR.

The SM-TL also provides a service to a Short Message Application Layer (SM-AL). This service enables the SM-AL to transfer short messages to its peer entity, receive short messages from its peer entity, and receive reports about earlier requests for short messages to be transferred. The PDUs used by this layer include SMS-DELIVER (to send SMS messages from the SC 33 to the MS 27), SMS SUBMIT (to transport SMS messages from the MS 27 to the SC 33), and different Report type PDUs such as SMS DELIVER REPORT.

Figure 9:
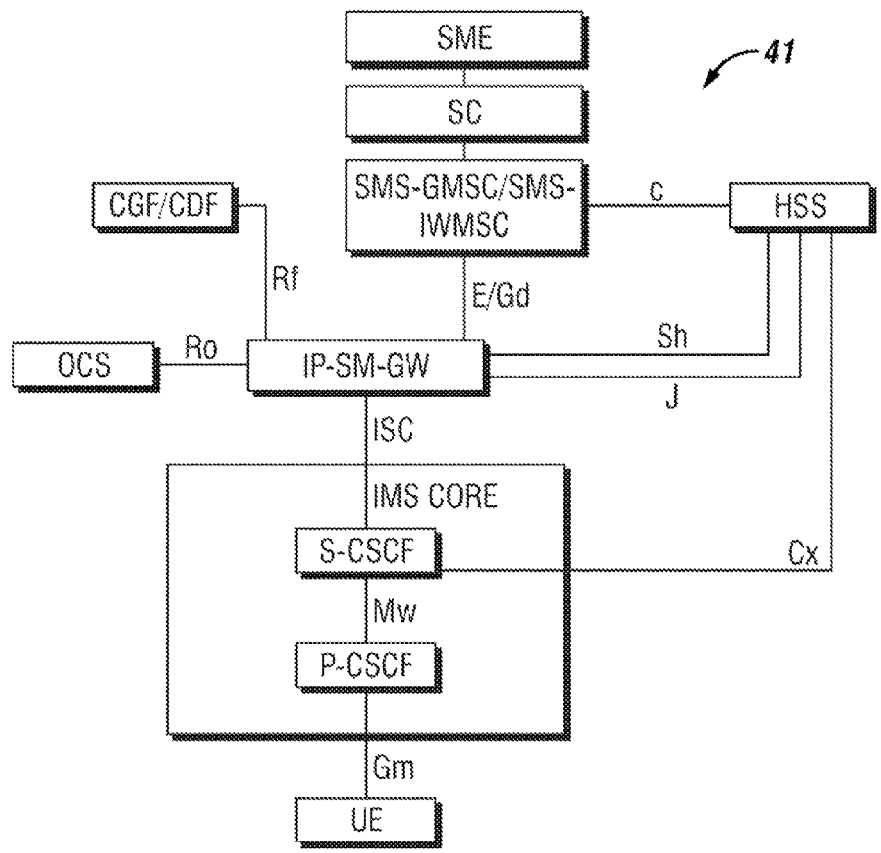
FIG. 9 is a simplified block diagram illustrating an architecture for providing SMS over a generic IP access network.

FIG. 9 is a simplified block diagram illustrating an architecture for providing SMS over a generic IP access network 41, as specified by 3GPP for 3GPP Release-7 in 3GPP TS 23.204. This feature is specified on top of the IMS core network.

Figure 10:
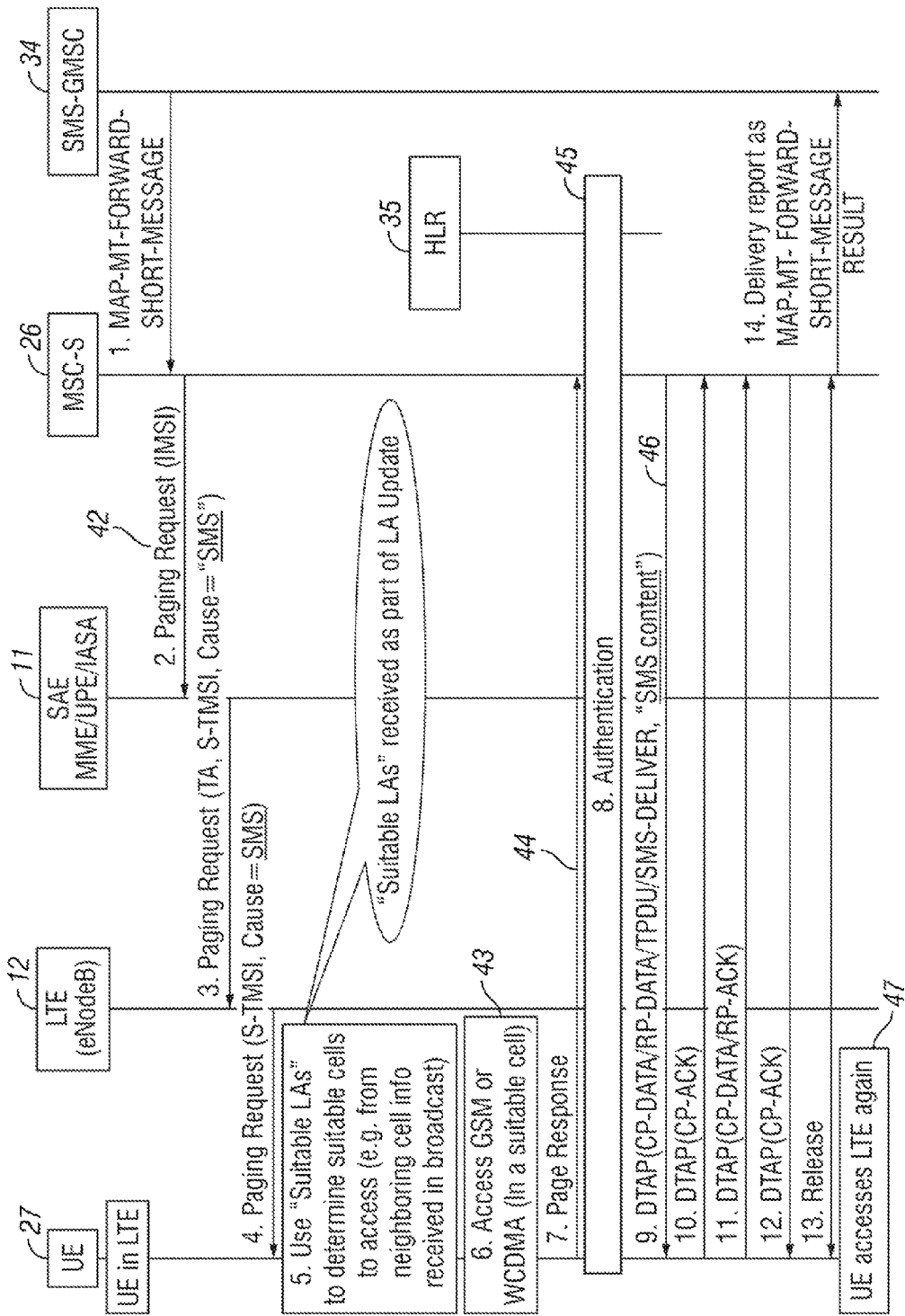
FIG. 10 is a signaling diagram illustrating the actions taken when an MT SMS message is forwarded to the UE in an existing CS Fallback solution.

FIG. 10 is a signaling diagram illustrating the actions taken when an MT SMS message is forwarded to the UE 27 in the existing CS Fallback solution. The MSC-S 26 initiates a paging request 42 for SMS over the SGs interface 25 indicating SMS as the cause. At 43, the UE performs the CS Fallback to GSM/WCDMA and sends a page response 44 in the selected cell. After optional authentication 45, the SMS is delivered at 46 from the MSC-S to the UE. At 47, the UE goes back to the LTE access.

Figure 11:
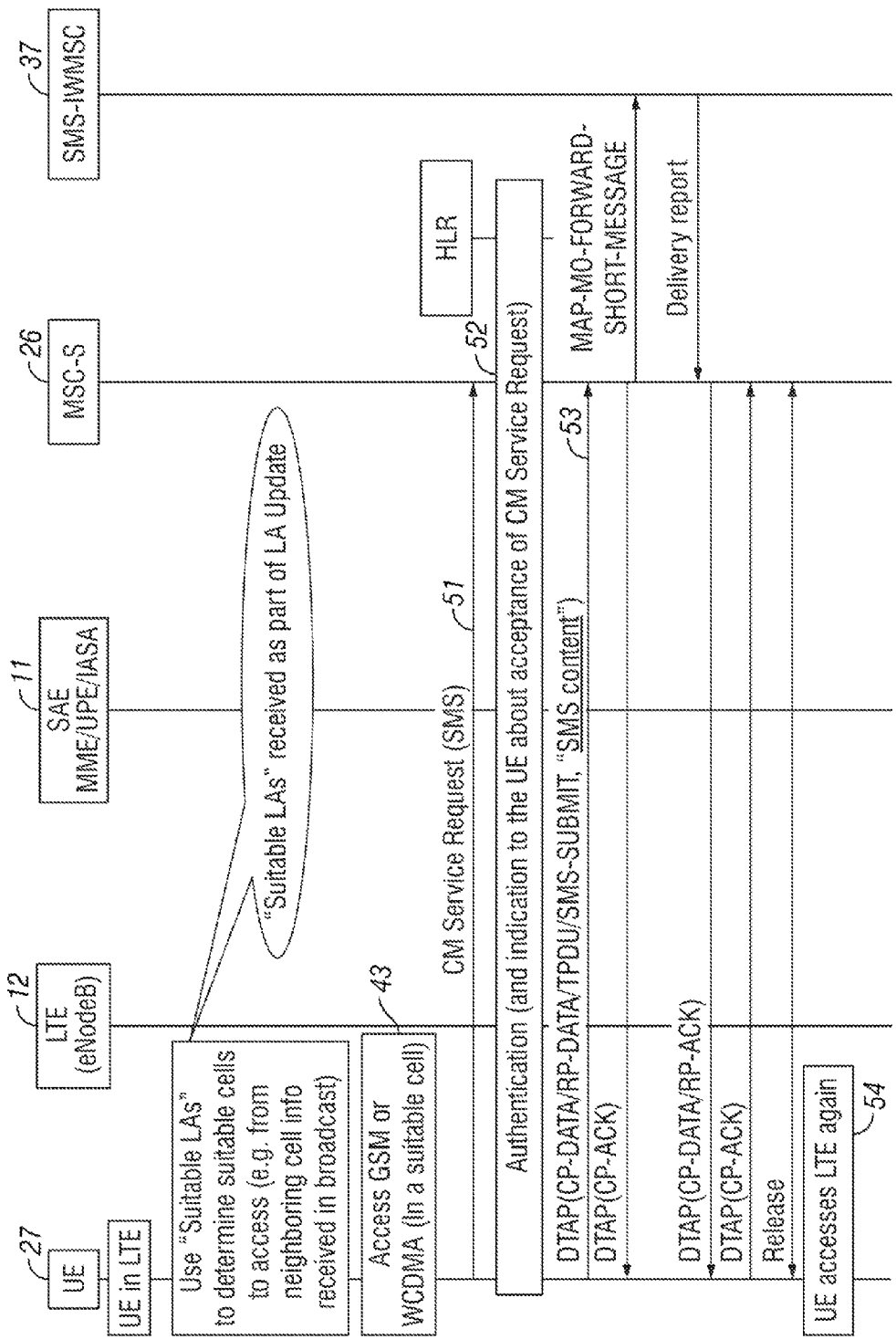
FIG. 11 is a signaling diagram illustrating the actions taken when an MO SMS message is triggered from the UE in the existing CS Fallback solution.

FIG. 11 is a signaling diagram illustrating the actions taken when an MO SMS message is triggered from the UE 27 in the existing CS Fallback solution. At 43, the UE performs the CS Fallback to GSM/WCDMA and initiates a CM Service request 51 for SMS. After optional authentication and indication to the UE regarding the acceptance of the CM Service request at 52, the SMS is delivered at 53 from the UE 27 to the MSC-S 26. At 54, the UE goes back to the LTE access.

Similar procedures to those described in FIGS. 10 and 11 apply also for the CSoLTE-I solution and MT/MO SMS messages. For the MT SMS case, the MSC-S 26 pages the UE 27 using the SGs interface 25 to the MME 13 and then via the eNodeB in the LTE radio access network 12. Thereafter, the UE contacts the PMSC 21 using the U8c interface (shown in FIG. 3) and replies to the paging request. The MT SMS message is then delivered from the PMSC to the UE. As part of this process, the SAE/LTE bearer for CSoLTE-I solution signaling must be activated.

For the MO SMS case, the UE 27 contacts the PMSC 21 using the U8c interface and performs a CM Service Request. The MO SMS message is then transported from the UE to the PMSC. As part of this process, the SAE/LTE bearer for CSoLTE-I solution signaling is established/activated for a very short time period.

The main problem with the CS Fallback solution is that all other SAE/LTE bearers being used would also be moved to the GSM/WCDMA because the UE is receiving or sending an SMS message.

The main problem with the CSoLTE-I solution is that the needed SAE/LTE bearers would need to be activated whenever the UE is receiving or sending an SMS message of approximately 200 octets or less, even if multiple SMS transferred.

The main problem with using SMS over a generic 3GPP IP access is that the access is based on an IMS core network, and the usage for CSoLTE solutions is a deployment scenario in which an IMS core network is not available.

The present invention utilizes the SGs interface for both MT and MO SMS services. The prerequisite is that the SGs interface is used for MM procedures, that is, the UE becomes attached in the MSC-S. Thus, the present invention applies for the CS Fallback and CSoLTE-I solutions. In addition, the NAS-signaling support between the UE 27 and an enhanced MME 64 is extended to provide support for both MT and MO SMS service.

Figure 12:
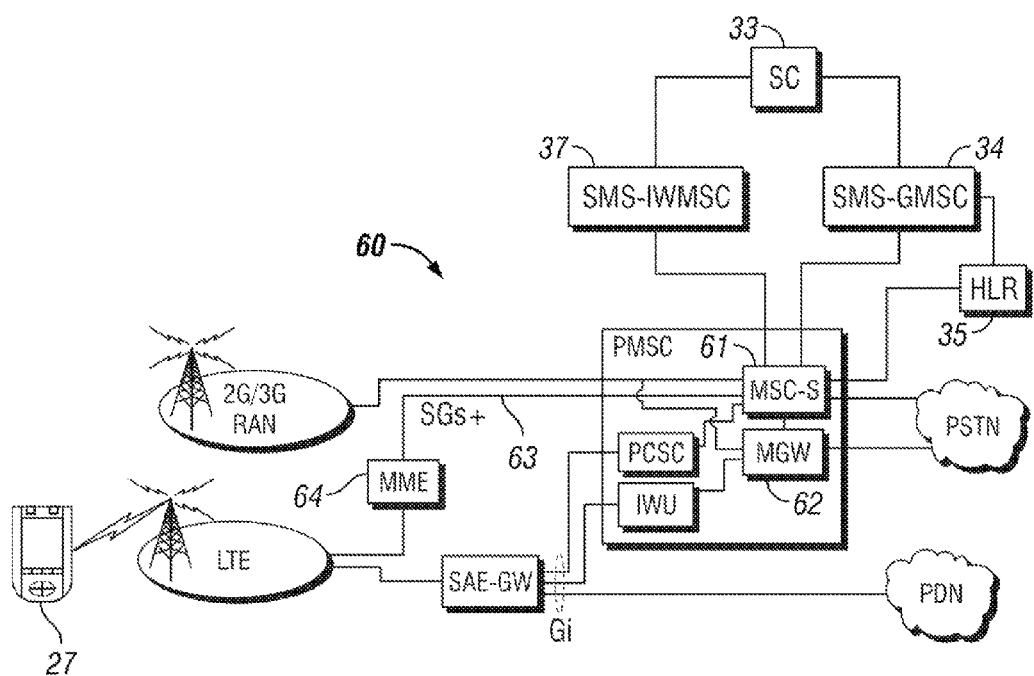
FIG. 12 is a simplified block diagram of an exemplary embodiment of an architecture for SMS support in the CSoLTE solutions based on an extended SGs interface (SGs+) according to the teachings of the present invention.

FIG. 12 is a simplified block diagram of an exemplary embodiment of an architecture 60 for SMS support in the CSoLTE solutions based on an extended interface (SGs+) 63 according to the teachings of the present invention. The functions related to the SMS support are connected to a modified MSC-S 61 which also implements the SGs+ interface. It should be noted that the CS domain may include the MSC-S 61 and an MGW 62 or may alternatively consist of classical MSC/VLR nodes (not shown).

The existing SGs interface 25 supports limited Mobility Management procedures. For example, authentication is not supported. In the present invention, an extended SGs+ interface 63 and an extended BSSAP+ protocol are extended with support for DTAP-like transmission of upper layer PDUs. The new SGs+ interface 63 still utilizes connectionless SCCP operation in one embodiment, so every message must identify the UE 27 and the transaction to which a message belongs.

The UE's IMSI is used to identify the subscriber, and the PDU header is used to identify different transactions (for example, the Layer 3 message header for the CP-DATA/CP-ACK/CP-ERROR messages). The new BSSAP+ messages can be described as follows:

BSSAP+-DOWNLINK-DATA-TRANSFER (BDDT). The BDDT message is used to transport entire NAS signaling messages in the direction from the MSC-S 61 to an enhanced MME 64 over the SGs+ interface 63. For SMS support, this means the BDDT message provides the SM-LL layer over the SGs+ interface in the other direction. The PDUs transferred in this message (referred to herein as SMS-PDUs) are the CP-DATA, CP-ACK, and CP-ERROR as defined in 3GPP TS 24.011. The IMSI is used as the UE identifier.

BSSAP+-UPLINK-DATA-TRANSFER (BUDT). The BUDT message is used to transport entire NAS signaling messages in the direction from the MME 64 to the MSC-S 61 over the SGs+ interface 63. For SMS support, this means the BUDT message provides the SM-LL layer over the SGs+ interface in this direction. The SMS-PDUs transferred in this message are the CP-DATA, CP-ACK, and CP-ERROR as defined in 3GPP TS 24.011. The IMSI is used as the UE identifier.

In the same way, the present invention extends SAE NAS signaling between the MME 64 and the UE 27 with similar support to transparently transfer "CS NAS signaling" between the MSC-S 61 and the UE. These messages may be referred to, for example, as the NAS-X-UPLINK (NASXU) and NAS-X-DOWNLINK (NASXD) messages.

The MSC-S 61 supporting the SMS services over the SGs+ interface 63 is modified to forward the received MT SMS messages over the SGs+ interface using the BDDT message. The BDDT message includes the initial NAS PDU consisting of (CP-DATA/RP-DATA/TPDU/SMS-DELIVER, "SMS content"). The MSC-S sends the BDDT message when the UE 27 is registered for CS services over the SGs+ interface. The BDDT message is sent to the MME 64 where the UE is registered. The MSC-S would normally need to perform paging of the UE in the 2G/3G RANs and then forward the SMS after the UE has responded to the paging and a signaling connection has been established to the UE. In the SMS over SGs+ case, the paging is moved to the SAE/LTE and is performed by the MME 64, if needed, once the SGs+ paging request message is received from the MSC-S or when the initial BDDT message is received from the MSC-S.

For MO SMS, the modified MSC-S 61 must also be able to handle the connectionless nature of the SGs+ interface in some embodiments (while other embodiments use a connection-oriented solution). This means that the first (and subsequent) BUDT message is received without a signaling connection being established as opposed to existing MO SMS transfer procedures.

The enhanced MME 64 supporting the MO and MT SMS services over the SGs+ interface is also modified to perform a Network Triggered Service Request once the initial BDDT message is received from the MSC-S 61. This means that if the UE 27 is in LTE-IDLE state, the MME 64 triggers paging of the UE. Alternatively, if the UE is in LTE-ACTIVE state, the contents of the received BDDT message are transferred to the UE in a NAS-X-DOWNLINK message on the S1 connection and then on the RRC connection from the eNodeB. In the same way, all NAS-X-UPLINK messages received from the UE 27 on the S1 connection are forwarded to the MSC-S 61 in BUDT messages.

The description below describes different sequences in which the SGs+ interface 63 supports SMS. Four different sequences are shown when MT SMS is triggered and depending on whether the UE 27 is in LTE-IDLE or in LTE-ACTIVE state.

Figure 13A:
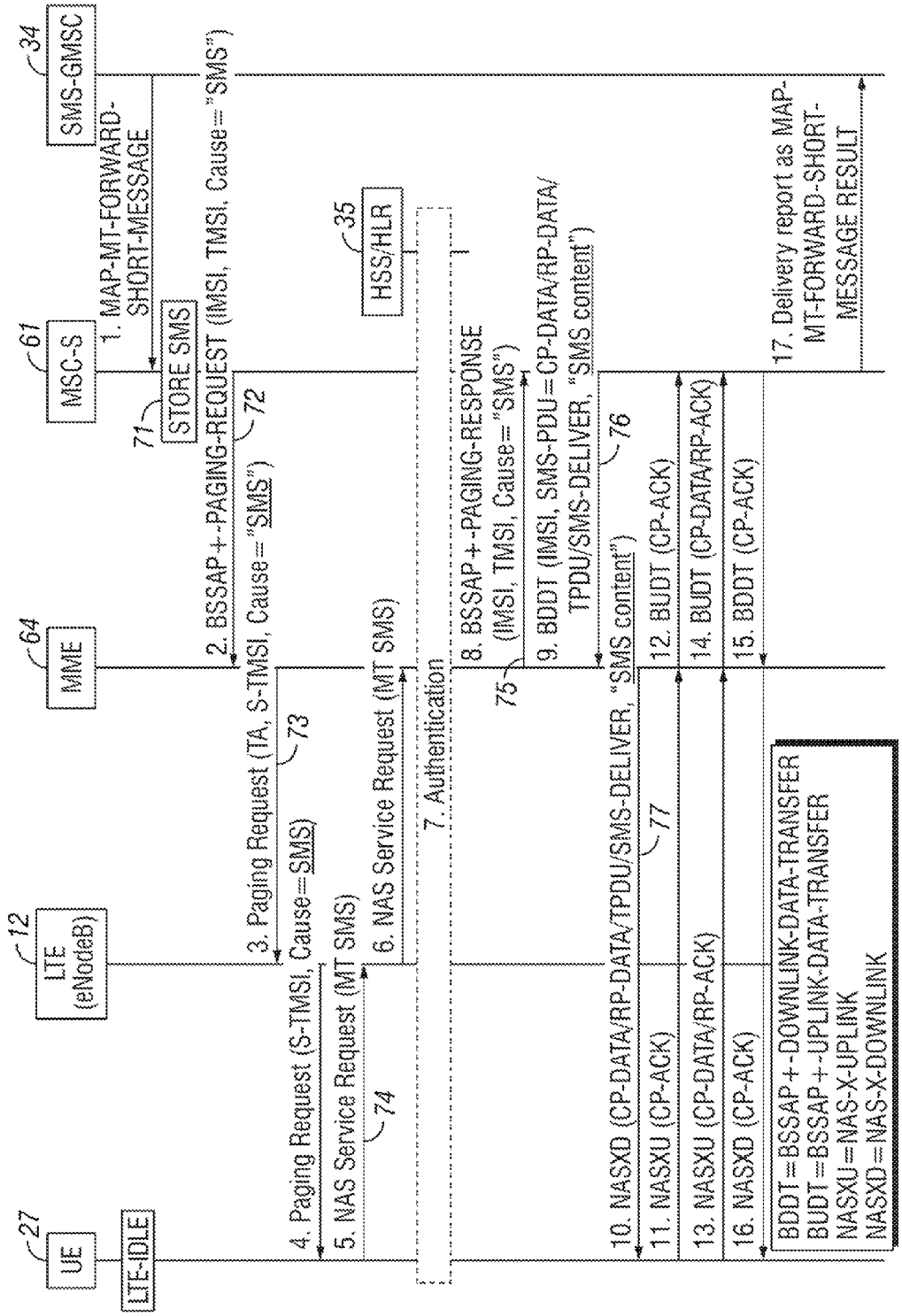
FIG. 13A is a signaling diagram illustrating a first embodiment of a procedure for MT SMS transfer over SGs+ when the terminal is in LTE-IDLE state.

FIG. 13A is a signaling diagram illustrating a first embodiment of a procedure for MT SMS transfer over SGs+ when the UE 27 is in LTE-IDLE state. In this embodiment, the MSC-S 61 stores the received SMS message locally at 71 and sends a paging request 72 to the MME 64 indicating SMS as the cause. The MME then sends a paging request 73 to the UE via the needed eNodeBs. The UE responds with a NAS Service Request 74 and a NAS signaling connection is established. Once the NAS signaling connection is established between the MME and the UE, the MME forwards a paging response (or a service request) 75 to the MSC-S 61 indicating this to the MSC-S. The MSC-S then forwards the stored SMS message to the MME in a BDDT message 76 over the SGs+ interface 63. The MME forwards the SMS message content to the UE 27 in a NAS-X-DOWNLINK message 77 on the S1 connection to the eNodeB and then on the RRC connection from the eNodeB to the UE. Thereafter, all communication is transparently tunneled between the MSC-S and the UE.

Figure 13B:
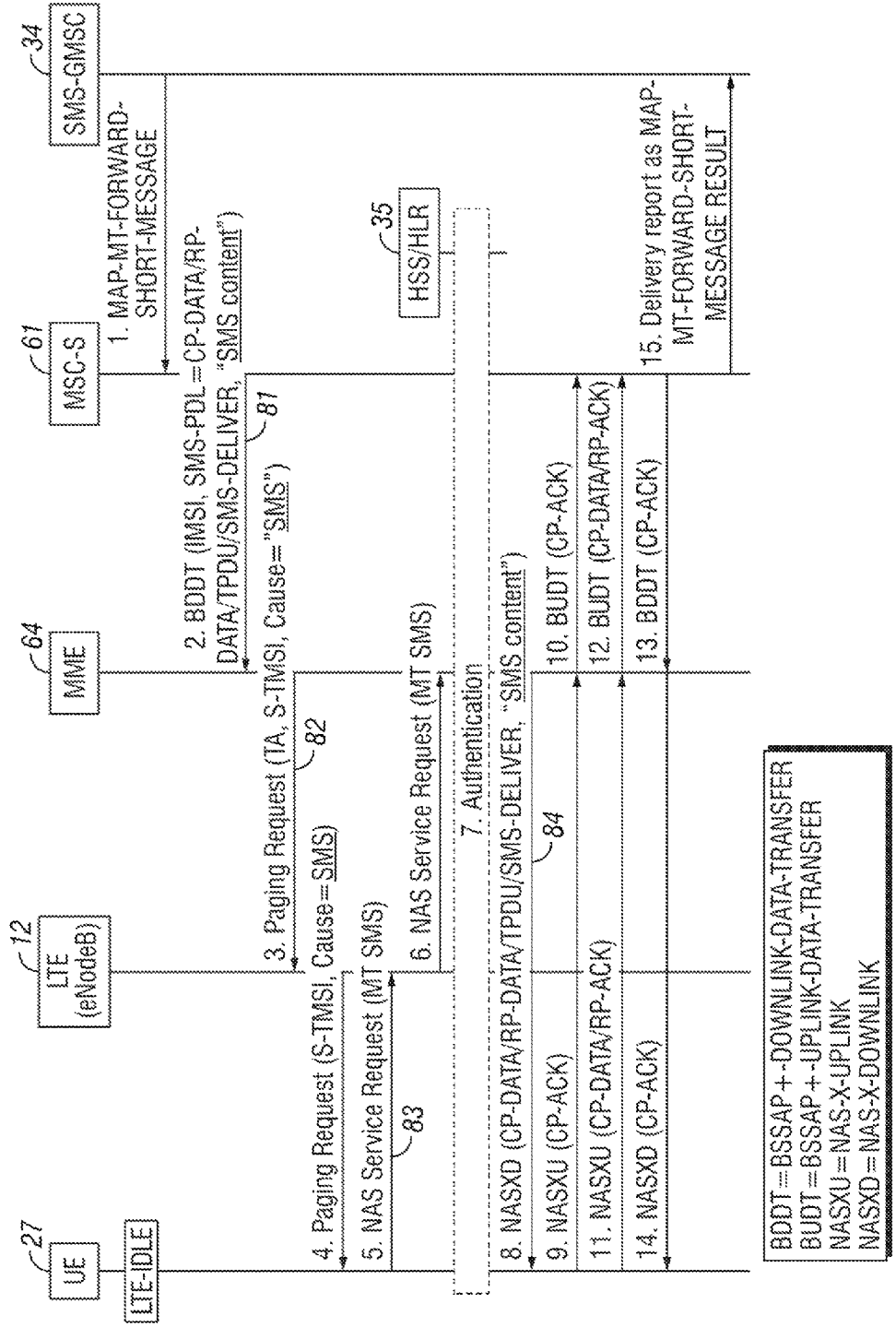
FIG. 13B is a signaling diagram illustrating a second embodiment of a procedure for MT SMS transfer over SGs+ when the terminal is in LTE-IDLE state.

FIG. 13B is a signaling diagram illustrating a second embodiment of a procedure for MT SMS transfer over SGs+ when the UE 27 is in LTE-IDLE state. In this embodiment, the MSC-S 61 forwards the received SMS message to the MME 64 in a BDDT message 81 over the SGs+ interface 63. The MME then initiates a paging request 82 toward the UE. The UE responds with a NAS Service Request 83 and a NAS signaling connection is established. Once the NAS signaling connection is established between the MME and the UE, the MME forwards the received SMS message to the UE in a NAS-X-DOWNLINK message 84 on the S1 connection to the eNodeB and then on the RRC connection from the eNodeB to the UE. Thereafter, all communication is transparently tunneled between the MSC-S and the UE.

Figure 14A:
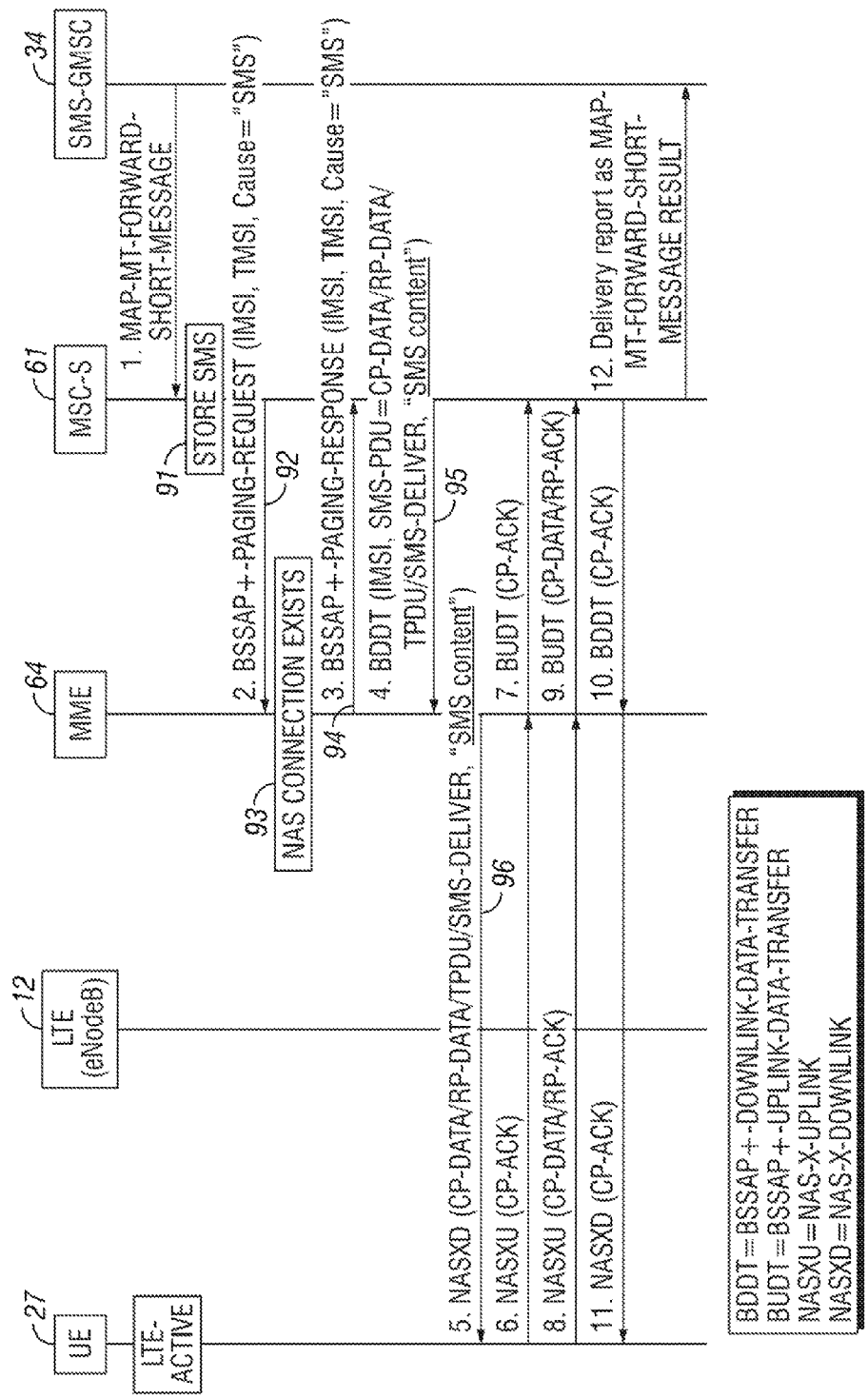
FIG. 14A is a signaling diagram illustrating a first embodiment of a procedure for MT SMS transfer over SGs+ when the terminal is in LTE-ACTIVE state.

FIG. 14A is a signaling diagram illustrating a first embodiment of a procedure for MT SMS transfer over SGs+ when the UE 27 is in LTE-ACTIVE state. In this embodiment, the MSC-C 61 stores the received SMS message locally at 91 and sends a paging request message 92 to the MME 64 indicating SMS as the cause. At 93, the MME detects that a NAS signaling connection to the UE already exists. So the MME returns a paging response (or a service request) message 94 to the MSC-S indicating this to the MSC-S. The MSC-S then forwards the stored SMS message to the MME in a BDDT message 95 over the SGs+ interface 63. The MME forwards the SMS message content to the UE 27 in a NAS-X-DOWNLINK message 96 on the S1 connection to the eNodeB and then on the RRC connection from the eNodeB to the UE. Thereafter, all communication is transparently tunneled between the MSC-S and the UE.

Figure 14B:
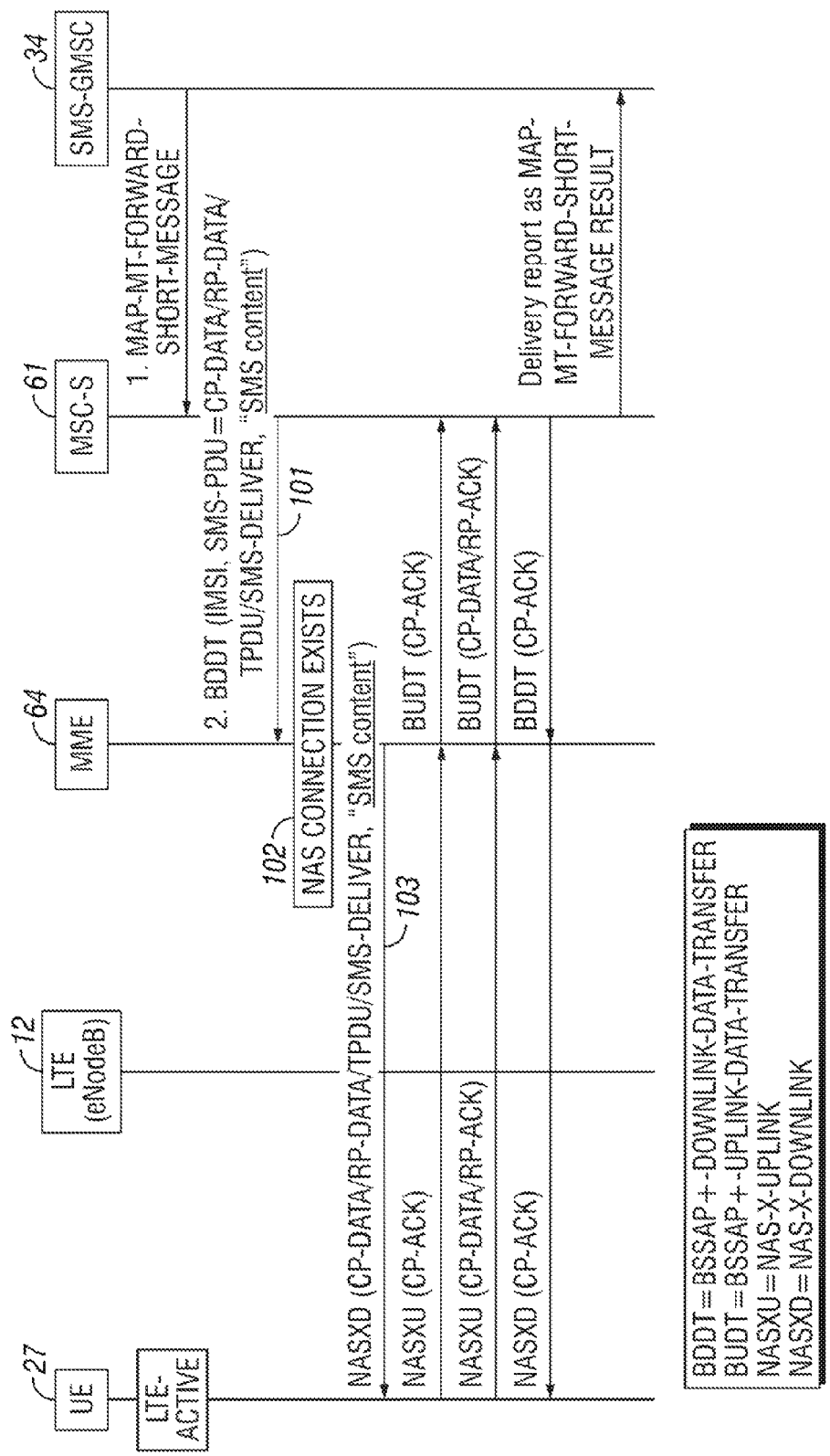
FIG. 14B is a signaling diagram illustrating a second embodiment of a procedure for MT SMS transfer over SGs+ when the terminal is in LTE-ACTIVE state.

FIG. 14B is a signaling diagram illustrating a second embodiment of a procedure for MT SMS transfer over SGs+ when the UE 27 is in LTE-ACTIVE state. In this embodiment, the MSC-C 61 forwards the received SMS message to the MME 64 in a BDDT message 101 over the SGs+ interface 63. At 102, the MME detects that a NAS signaling connection to the UE already exists. So the MME forwards the SMS message content to the UE 27 in a NAS-X-DOWNLINK message 103 on the S1 connection to the eNodeB and then on the RRC connection from the eNodeB to the UE. Thereafter, all communication is transparently tunneled between the MSC-S and the UE.

The description below describes different sequences in which the SGs+ interface 63 supports SMS. One sequence is shown when MO SMS is triggered and when the UE 27 is in LTE-IDLE or in LTE-ACTIVE state.

Figure 15:
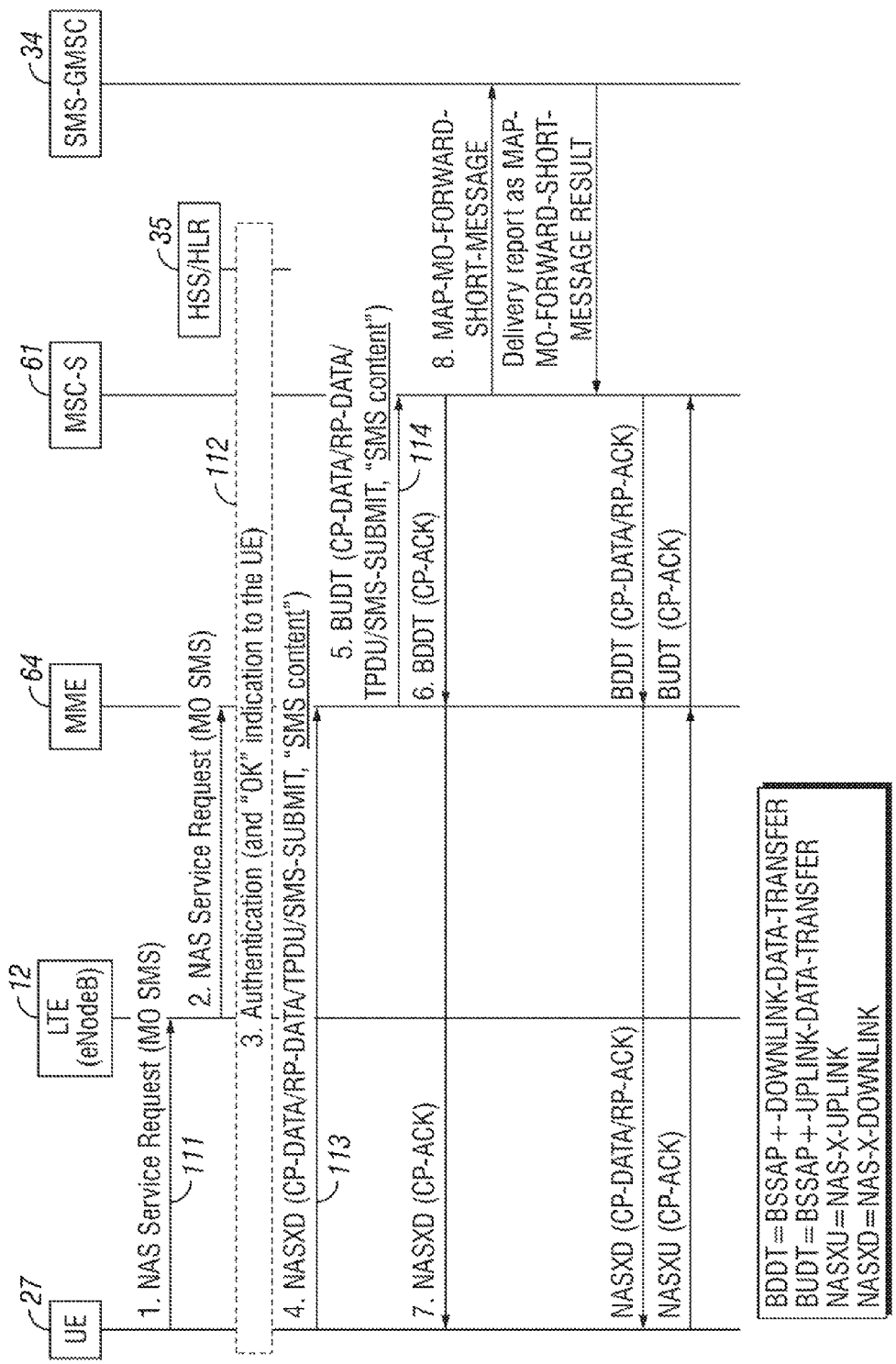
FIG. 15 is a signaling diagram illustrating an embodiment of a procedure for MO SMS transfer over SGs+ when the terminal is either in LTE-IDLE or in LTE-ACTIVE state.

FIG. 15 is a signaling diagram illustrating an embodiment of a procedure for MO SMS transfer over SGs+ when the UE 27 is in either LTE-IDLE or in LTE-ACTIVE state. When the UE is in LTE-IDLE state, the procedure begins by establishing a NAS signaling connection. The UE does this by sending a NAS Service Request 111 indicating that mobile originated SMS is requested. The eNodeB in the LTE radio access network 12 forwards the request to the MME 64. Following authentication at 112, an OK indication is returned to the UE. The UE then sends a NAS-X-UPLINK message 113 to the MME with the SMS message content. The MME sends a BUDT message 114 to the MSC-S 61 over the SGs+ interface 63 with the SMS message content for forwarding to the destination SME through the SMS-GMSC 34. Thereafter, all communication is transparently tunneled between the MSC-S and the UE.

The procedure for MO SMS transfer over SGs+ when the UE 27 is in LTE-ACTIVE state is the same as the procedure for LTE-IDLE state a except that the initial steps for establishing a NAS signaling connection are skipped when the UE is already in LTE-ACTIVE state.

In the embodiments described above, the existing SM-LL layer and related protocol (i.e., messages CP-DATA, CP-ACK, and CP-ERROR) and the existing SM-RL layer and related protocol (i.e., messages RP-DATA, RP-ACK, and RP-ERROR) are kept both in the MSC-S 61 and in the UE 27. In an alternative embodiment, these protocols are further optimized by creating a new single protocol to be used between the MSC-S and the UE. The new single protocol provides the same needed functionality as is now provided by these two protocols. As a result, the transaction handling provided by the SM-LL layer, for example, may still need to be included. Also, the information included in the RP Destination Address IE may need to be included in the new protocol (this IE contains the address of the SC for the MO SMS case).

In another alternative embodiment, the SGs+ interface 63 may be based on connection-oriented SCCP rather than the connectionless SCCP described above. The main principles of connection-oriented SCCP in the SGs+ interface are the same as are also utilized in the A-interface and Iu-interface. Thus, when a communication needs to be established, the side initiating the communication initiates the need for an SCCP connection by sending the SCCP Connection Request message to the remote side and possibly also including the first higher level message. If the remote node accepts the SCCP Connection request, it returns an SCCP Connection Confirm message to the initiating side. Thereafter, both sides can use the established SCCP connection.

For the MT-case, sending of a Paging request is not normally used for SCCP connection establishment, but in the SGs+ case, this may optionally be applied. Thus, the MSC-S initiates the SCCP Connection establishment when the MSC-S sends the BSSAP+-PAGING REQUEST message to the MME. The MME may then accept the SCCP-level connection when the MME receives the NAS Service Request from the UE. Alternatively, paging may be sent in connectionless mode, and the SCCP connection is established to the MSC-S first when the MME receives the NAS Service Request from the UE.

In the MO-case, the first message sent from the MME to the MSC-S initiates the SCCP connection establishment.

In the connection-oriented SCCP embodiment for MT SMS, the MSC-S 61 sends a BSSAP+-PAGING-REQUEST message to the MME 64 with a special indication that a signaling connection is to be established for the MT SMS once the UE 27 is successfully paged in the LTE radio access network 12 and an S1 connection is established to the UE. Thereafter, the MME establishes the SCCP signaling connection over the SGs+ interface 63 with a new BSSAP+-PAGING-RESPONSE message and the MSC-S uses the combined signaling connections to deliver the MT SMS message to the UE. In this embodiment, the signaling connection between the MSC-S 61 and the UE 27 consists of the SGs+ signaling connection to the MME 64, an S1 connection to the LTE eNodeB, and an RRC connection to the UE.

A similar approach may be applied for the MO SMS case. When the NAS Service Request sent from the UE 27 to the MME 64 indicates "MO SMS" as the establishment cause, the MME establishes the SCCP signaling connection over the SGs+ interface 63 with a new BSSAP+-SERVICE-REQUEST message to the MSC-S 61. If the MSC-S allows the establishment of that connection, the UE is notified, and the MO SMS is delivered between the UE and the MSC-S utilizing the SGs+, S1, and RRC signaling connections. It has thus been shown that with the present invention, the changes in the CS core network are limited to the MSC-S. The rest of the existing infrastructure for SMS can be used unmodified. This means that all services related to SMS handling such as Message Waiting are handled in the Circuit Switched domain of the core network.

When the present invention is utilized in combination with the CS Fallback solution, all other SAE/LTE bearers can be kept unmodified and active in SAE/LTE. As a result, there is no possibility for service degradation just because the UE is receiving or sending an SMS message.

When the present invention is used in combination with the CSoLTE-I solution, there is no need to establish any additional SAE/LTE bearers just because the UE is receiving or sending an SMS message of approximately 200 hundred octets or less even if multiple SMS messages are transferred.

Finally, the present invention enables SMS to be supported in SAE/LTE without the need for deploying an IMS core network, which is a prerequisite for the SMS over a generic 3GPP IP Access network solution.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates all modifications that fall within the scope of the invention defined by the following claims.

What is claimed is:

1. A method of providing a circuit-switched (CS) service to a User Equipment (UE) over an SAE core network and an LTE radio access network, said method comprising the steps of:
    extending an SGs interface to provide an SGs+ interface between a Mobility Management Entity (MME) in the SAE core network and a Mobile Switching Center Server (MSC-S), wherein the SGs+ interface supports transmission of upper layer packet data units;
    transferring CS service messages in SGs+ messages sent between the MSC-S and the MME utilizing the SGs+ interface, wherein the step of transferring CS service messages includes sending from the MSC-S to the MME, an SGs+ downlink data transfer message including upper layer packet data units destined for a terminating UE, or sending from the MME to the MSC-S, an SGs+ uplink data transfer message including upper layer packet data units originated by an originating UE; and transferring CS service message contents between the MME and the UE via the LTE radio access network in non-access stratum (NAS) messages;

wherein the CS service is a Short Message Service (SMS) and the step of transferring CS service messages includes sending from the MSC-S to the MME, an SGs+ downlink data transfer message, said SGs+ downlink data transfer message comprising SMS message content destined for the terminating UE.

2. The method according to claim 1, wherein the upper layer packet data units are transmitted utilizing connection-oriented Signaling Connection Control Part (SCCP) operation.

3. The method according to claim 1, wherein the upper layer packet data units are transmitted utilizing connectionless Signaling Connection Control Part (SCCP) operation.

4. The method according to claim 1, wherein the terminating UE is in LTE-ACTIVE state, and the method further comprises the steps of:

receiving by the MME, a paging request message from the MSC-S, said paging request message indicating the SGs+ downlink data transfer message is available for the terminating UE; and returning a response message from the MME to the MSC-S without paging the terminating UE;

wherein the MSC-S sends to the MME, the SGs+ downlink data transfer message in response to receiving the response message.

5. The method according to claim 4, wherein the upper layer packet data units are transmitted utilizing connection-oriented Signaling Connection Control Part (SCCP) operation.

6. The method according to claim 4, wherein the upper layer packet data units are transmitted utilizing connectionless Signaling Connection Control Part (SCCP) operation.

7. The method according to claim 1, wherein the terminating UE is in LTE-ACTIVE state, and the step of transferring CS service message contents between the MME and the LTE radio access network includes sending a downlink NAS message through the LTE radio access network to the terminating UE in response to receiving the SGs+ downlink data transfer message, said downlink NAS message including the upper layer packet data units.

8. The method according to claim 1, wherein the terminating UE is in LTE-IDLE state, and the method further comprises, prior to receiving the SGs+ downlink data transfer message, the steps of:

receiving by the MME, a paging request message from the MSC-S, said paging request message indicating the SGs+ downlink data transfer message is available;

paging the terminating UE by the MME in response to receiving the SGs+ downlink data transfer message;

receiving by the MME, a paging response from the UE requesting mobile terminated SMS service; and sending a response message to the MSC-S;

wherein the MSC-S sends to the MME, the SGs+ downlink data transfer message in response to receiving the response message.

9. The method according to claim 8, wherein the upper layer packet data units are transmitted utilizing connection-oriented Signaling Connection Control Part (SCCP) operation.

10. The method according to claim 8, wherein the upper layer packet data units are transmitted utilizing connectionless Signaling Connection Control Part (SCCP) operation.

11. The method according to claim 1, wherein the terminating UE is in LTE-IDLE state, and the method further comprises the steps of:

paging the terminating UE by the MME in response to receiving the SGs+ downlink data transfer message; and receiving by the MME, a paging response from the terminating UE requesting mobile terminated SMS service;

wherein the step of transferring CS service message contents between the MME and the LTE radio access network includes sending a downlink NAS message through the LTE radio access network to the terminating UE In response to the paging response, said downlink NAS message including the upper layer packet data units.

12. The method according to claim 1, wherein said SGs+ downlink data transfer message includes SMS control plane packet data destined for the terminating UE.

13. The method according to claim 1, wherein the originating UE is in LTE-ACTIVE state, and the step of transferring CS service message contents between the MME and the LTE radio access network includes receiving by the MME, an uplink NAS message through the LTE radio access network from the originating UE, said uplink NAS message including the upper layer packet data units.

14. The method according to claim 13, wherein the upper layer packet data units are transmitted utilizing connection-oriented Signaling Connection Control Part (SCCP) operation.

15. The method according to claim 13, wherein the upper layer packet data units are transmitted utilizing connectionless Signaling Connection Control Part (SCCP) operation.

16. The method according to claim 13, wherein the originating UE is in LTE-IDLE state, and the method further comprises, before the MME receives the uplink NAS message, the step of:

receiving by the MME, a mobile originated CS service request from the originating UE requesting a mobile originated CS service; and sending a response indication from the MME to the originating UE establishing a NAS signaling connection;

wherein the originating UE sends the uplink NAS message in response to establishment of the NAS signaling connection.

17. The method according to claim 16, wherein the upper layer packet data units are transmitted utilizing connection-oriented Signaling Connection Control Part (SCCP) operation.

18. The method according to claim 16, wherein the upper layer packet data units are transmitted utilizing connectionless Signaling Connection Control Part (SCCP) operation.

19. The method according to claim 1, wherein the CS service is the Short Message Service (SMS) and the step of transferring CS service messages includes sending from the MME to the MSC-S, an SGs+ uplink data transfer message, said SGs+ uplink data transfer message Including SMS control plane packet data units and SMS message content originated by an originating UE.

20. An apparatus in a Mobility Management Entity (MME) in an SAE core network for providing a circuit-switched (CS) service to a User Equipment (UE) through the SAE core network and an LTE radio access network said apparatus comprising:

a processor; and a memory containing instructions executable by said processor, whereby said apparatus is operative to:

utilize an extended SGs interface (SGs+) with a Mobile Switching Center Server (MSC-S) in a CS core network to send and receive SGs+ messages, wherein the SGs+ interface supports transmission of upper layer packet data units, wherein utilizing the SGs+ interface includes transferring CS service messages in SGs+ messages sent over the SGs+ interface; and transfer CS service message contents between the MME and the UE via the LTE radio access network, wherein the CS service is a Short Message Service (SMS) and the transfer of CS service messages Includes receiving from the MSC-S, an SGs+ downlink data transfer message, said SGs+ downlink data transfer message comprising SMS message content for delivery to a terminating UE.

21. The apparatus according to claim 20, wherein utilizing the SGs+ interface includes transmitting the upper layer packet data units utilizing connection-oriented Signaling Connection Control Part (SCCP) operation.

22. The apparatus according to claim 20, wherein utilizing the SGs+ interface includes transmitting the upper layer packet data units utilizing connectionless Signaling Connection Control Part (SCCP) operation.

23. The apparatus according to claim 20, wherein said SGs+ uplink data transfer message includes SMS control plane packet data units originated by an originating UE.

24. A system for providing a circuit switched (CS) service to a User Equipment (UE) through an SAE core network and an LTE radio access network, said system comprising:

a Mobility Management Entity (MME) in the SAE core network;

a Mobile Switching Center Server (MSC-S) in a CS core network; and an extended SGs interface (SGs+) for sending and receiving SGs+ messages between the MME and the MSC-S, wherein the SGs+ interface supports transmission of upper layer packet data units in CS service messages;

wherein the MME and the MSC-S are operative to utilize the SGs+ interface to transfer CS service messages in SGs+ uplink and downlink data transfer messages sent over the SGs+ interface; and wherein the CS service is a Short Message Service (SMS) and utilizing the SGs+ interface includes sending and receiving SGs+ uplink and downlink data transfer messages that include SMS message content.

25. The system according to claim 24, wherein the MME is also operative to utilize a non-access stratum (NAS) interface with the LTE radio access network to send and receive extended NAS messages, said utilizing the NAS interface including transferring CS service message contents between the MME and the LTE radio access network in NAS messages.

26. The system according to claim 24, wherein the SGs+ uplink and downlink data transfer messages include SMS control plane packet data units.

27. The system according to claim 24, wherein utilizing the SGs+ interface includes sending and receiving upper layer packet data units utilizing connection-oriented Signaling Connection Control Part (SCCP) operation.

28. The system according to claim 24, wherein utilizing the SGs+ interface includes sending and receiving upper layer packet data units utilizing connectionless Signaling Connection Control Part (SCCP) operation.

* * * * *